US008644779B2

(12) United States Patent
Shin et al.

(10) Patent No.: US 8,644,779 B2
(45) Date of Patent: Feb. 4, 2014

(54) APPARATUS AND METHOD FOR ANTENNA MATCHING IN MOBILE DEVICE

(75) Inventors: Yong Joo Shin, Suwon-si (KR); Jae Ho Lee, Suwon-si (KR); Wan Sang Ryu, Suwon-si (KR); Da Jeong Kim, Gumi-si (KR); Ji Yeon Yun, Suwon-si (KR); Jin Woo Jung, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 315 days.

(21) Appl. No.: 13/105,174

(22) Filed: May 11, 2011

(65) Prior Publication Data

US 2011/0281532 A1    Nov. 17, 2011

(30) Foreign Application Priority Data

May 12, 2010   (KR) .................. 10-2010-0044624
Feb. 11, 2011  (KR) .................. 10-2011-0012565

(51) Int. Cl.
*H01Q 11/12*   (2006.01)
(52) U.S. Cl.
USPC ........... 455/125; 455/107; 455/121; 455/340; 375/219; 375/295
(58) Field of Classification Search
USPC ............. 455/550.1, 121, 115.1, 120, 77, 419, 455/466, 426.1, 553.1, 193.1, 556.1, 114.2, 455/119, 125, 123, 129, 68, 83, 107, 340, 455/150.1, 178.1, 187.1, 191.1; 343/861; 333/17.3, 32; 375/219, 295, 316
See application file for complete search history.

(56) References Cited

U.S. PATENT DOCUMENTS

| 6,961,368 | B2* | 11/2005 | Dent et al. .................. 375/219 |
| 7,332,980 | B2* | 2/2008 | Zhu et al. .................... 333/17.3 |
| 7,548,762 | B2* | 6/2009 | Fabrega-Sanchez et al. .......................... 455/556.1 |
| 7,671,693 | B2* | 3/2010 | Brobston et al. ............. 333/17.3 |
| 8,026,773 | B2* | 9/2011 | Zhu et al. ......................... 333/32 |
| 8,190,109 | B2* | 5/2012 | Ali et al. ........................ 455/123 |
| 2007/0135160 | A1* | 6/2007 | Fabrega-Sanchez et al. .......................... 455/553.1 |
| 2007/0194859 | A1* | 8/2007 | Brobston et al. ............. 333/17.3 |
| 2008/0094149 | A1* | 4/2008 | Brobston ...................... 333/17.3 |
| 2008/0218291 | A1* | 9/2008 | Zhu et al. ........................ 333/32 |
| 2009/0243397 | A1* | 10/2009 | Cook et al. .................... 307/104 |
| 2011/0086598 | A1* | 4/2011 | Ali et al. ..................... 455/115.1 |
| 2011/0086601 | A1* | 4/2011 | Ali et al. ........................ 455/121 |
| 2011/0086630 | A1* | 4/2011 | Manssen et al. .............. 455/419 |

* cited by examiner

*Primary Examiner* — Tan Trinh
(74) *Attorney, Agent, or Firm* — Jefferson IP Law, LLP (57) ABSTRACT

An apparatus and a method of realizing an antenna matching in accordance with a user's body effect and a state of a mobile device are provided. The method includes determining a state of the mobile device on a basis of a call mode and at least one of whether an external device is connected to the mobile device, whether a receiver is being used, whether a speaker is being used, and whether a proximity sensor is activated, determining an optimal Tunable Matching Network (TMN) circuit adjustment value in accordance with the determined state, and performing the antenna matching in accordance with the optimal TMN circuit adjustment value.

16 Claims, 5 Drawing Sheets

APPARATUS AND METHOD FOR ANTENNA MATCHING IN MOBILE DEVICE

PRIORITY

This application claims the benefit under 35 U.S.C. §119 (a) of a Korean patent application filed on May 12, 2010 in the Korean Intellectual Property Office and assigned Serial No. 10-2010-0044624, and a Korean patent application filed on Feb. 11, 2011 in the Korean Intellectual Property Office and assigned Serial No. 10-2011-0012565, the entire disclosures of which are hereby incorporated by reference.

BACKGROUND OF THE INVENTION

1. Field of the Invention

The present invention relates to mobile device technology. More particularly, the present invention relates to an apparatus and method for realizing an antenna matching in accordance with a user's body effect and a state of a mobile device.

2. Description of the Related Art

Normally, a transmitting and receiving apparatus of the related art used for wireless communication has an antenna. In this apparatus, a mismatching between the antenna and a transmission circuit may cause degradation in the performance of the apparatus. In order to solve such a mismatching, a mobile device of the related art may often employ a Fixed Matching Network (FMN) technique using a fixed inductive-capacitive (LC) circuit that includes an inductor and a capacitor. Unfortunately, the FMN technique may require too much time to find optimal values of the LC circuit components for an antenna matching when the device is developed. Moreover, since changes in LC circuit component values may not be possible depending on field conditions, Radio Frequency (RF) performance problems such as a call drop or an occurrence of mute, especially under weak signal environments, may occur frequently.

A Tunable Matching Network (TMN) technique has been developed to eliminate certain shortcomings of the FMN technique. The TMN technique uses a variable LC circuit instead of a fixed LC circuit.

The TMN technique may, however, fail to duly consider various factors that affect antenna radiation performance according to usage types of the mobile device in actual environments. Since antenna radiation performance can be greatly influenced by environmental interfaces such as a user's body effect and a state of the mobile device, an optimal antenna matching should be performed in accordance with various environments.

Therefore, in the TMN technique, there is a need for favorable ways of tuning the TMN circuit (namely, an LC circuit) in view of actual environmental interfaces.

BRIEF SUMMARY OF THE INVENTION

Aspects of the present invention are to address at least the above-mentioned problems and/or disadvantages and to offer at least the advantages described below. Accordingly, an aspect of the present invention is to provide an apparatus and a method for antenna matching in a mobile device.

Another aspect of the present invention is to provide an apparatus and a method for realizing antenna matching in the mobile device in accordance with a user's body effect and a state of the mobile device.

Still another aspect of the present invention is to provide an apparatus and method for determining an optimal Tunable Matching Network (TMN) circuit adjustment value in a mobile device, in accordance with a user's body effect and the state of the mobile device.

Yet another aspect of the present invention is to provide an apparatus and a method of determining the optimal TMN circuit adjustment value in a mobile device on a basis of a lookup table in which optimal TMN circuit adjustment values are recorded, the optimal TMN circuit adjustment values being determined in accordance with criteria such as bands, channels, a mode of the mobile device (e.g., a call mode or an idle mode), a slide status of the mobile device (e.g., a slide up (open) status or a slide down (closed) status), a position of the mobile device (e.g., located at a user's hand, located near a user's head, or located at any place relatively free from a user's body effect), and the like.

Yet another aspect of the present invention is to provide an apparatus and a method for determining a position of a mobile device (e.g., located at a user's hand, located near a user's head, or located at a place relatively free from a user's body effect), in accordance with criteria such as a slide status of the mobile device (e.g., a slide up status or a slide down status), a mode of the mobile device (e.g., a call mode or an idle mode), whether a receiver is being used, whether a loudspeaker is being used, whether an ear jack is connected, whether a BLUETOOTH™ audio device is connected, etc.

Yet another aspect of the present invention is to provide an apparatus and a method for determining the state of a mobile device among a Free state, a Hand state, a Head & Hand state, and a Universal Serial Bus (USB) Optimization state, in accordance with a call mode, whether a proximity sensor is activated, and whether a USB device is connected.

In accordance with an aspect of the present invention, a method for antenna matching in a mobile device is provided. The method includes determining the state of the mobile device on a basis of a call mode and at least one of whether an external device is connected, whether a receiver is being used, whether a speaker is being used, and whether a proximity sensor is activated, determining an optimal TMN circuit adjustment value in accordance with the determined state of the mobile device, and performing the antenna matching in accordance with the optimal TMN circuit adjustment value.

According to another aspect of the present invention, an apparatus for antenna matching in a mobile device is provided. The apparatus includes a control unit for determining a state of the mobile device on a basis of a call mode and at least one of whether an external device is connected to the mobile device, whether a receiver is being used, whether a speaker is being used, and whether a proximity sensor is activated, and for determining an optimal TMN circuit adjustment value in accordance with the determined state of the mobile device, and a TMN unit for receiving the optimal TMN circuit adjustment value from the control unit and for performing the antenna matching in accordance with the received value.

According to still another aspect of the present invention, an apparatus for antenna matching in a mobile device is provided. The apparatus includes a connector for connecting an external device, a proximity sensor for detecting an approach of a foreign object, a control unit for determining a state of the mobile device on a basis of one or more of a signal received from the connector, a signal received from the proximity sensor, and a call mode, and for determining an optimal TMN circuit adjustment value in accordance with the determined state of the mobile device, and a TMN unit for receiving the optimal TMN circuit adjustment value from the control unit and for performing the antenna matching in accordance with the received value.

Aspects of the present invention may realize an optimal antenna matching by determining an optimal TMN circuit adjustment value in accordance with a user's body effect and a state of a mobile device. Furthermore, aspects of this invention improve Radio Frequency (RF) performance in various field conditions, minimize reflected power, reduce power consumption, and increase a battery life. It is also possible to improve a transmission/reception rate and a mute rate of the mobile device by using the present invention.

Other aspects, advantages, and salient features of the invention will become apparent to those skilled in the art from the following description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF THE EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Disclosed hereinafter is technique to realize antenna matching in a mobile device in accordance with a user's body effect and a state of the mobile device.

In particular, the mobile device of this exemplary embodiment of the present invention performs antenna matching by using a lookup table in which optimal Tunable Matching Network (TMN) circuit adjustment values are recorded in accordance with criteria such as bands, channels, a mode of the mobile device (e.g., a call mode or an idle mode), a slide status of the mobile device (e.g., a slide up (open) status or a slide down (closed) status), a position of the mobile device (e.g., located at a user's hand, located near a user's head, or located at a place relatively free from a user's body effect), and the like. In a case where the mobile device is not a slide type, for example, if the mobile device is a bar type, a slide status of the mobile device is not considered when the lookup table is created.

As is well known in the related art, each service network includes a number of bands, each of which comprises many channels. Meanwhile, there is an insignificant deviation in radiation performance between adjacent channels. Therefore, in accordance with a limited memory capacity of the mobile device, it is inefficient to assign a different optimal TMN circuit adjustment value to each respective channel when the lookup table is created.

For the above reason, the exemplary embodiment of the present invention classify all channels in each band of each service network into groups, and then assign an optimal TMN circuit adjustment value to each group of channels. A number of channel groups in each service network band may be determined in accordance with a bandwidth of each band.

For instance, the number of channel groups for each band supported by a Global System for Mobile Communications (GSM) or Wideband Code Division Multiple Access (WCDMA) network may be determined as shown in Table 1.

TABLE 1

| Band | | Total Channels | Groups | Channels per Group | Bandwidth [MHz] |
|---|---|---|---|---|---|
| GSM | 850 | 124 | 4(4) | 31 | 6.2 |
| | 900 | 174 | 5(≈4.97143) | 35 | 7 |
| | 1800 | 374 | 6(≈5.93651) | 63 | 12.6 |
| | 1900 | 299 | 5(≈4.98333) | 60 | 12 |
| | Total | 971 | | | |
| WCDMA | 1-2100 | 277 | 5(≈4.94643) | 56 | 11.2 |
| | 2-1900 | 277 | 5(≈4.94643) | 56 | 11.2 |
| | 3-1800 | 352 | 6(≈5.9661) | 59 | 11.8 |
| | 4-1800~2100 | 202 | 5(≈4.92683) | 41 | 8.2 |
| | 5-850 | 102 | 4(≈3.92308) | 26 | 5.2 |
| | 8-900 | 152 | 5(≈4.90323) | 31 | 6.2 |
| | Total | 1362 | | | |

The lookup table may contain optimal TMN circuit adjustment values according to bands, channels, a mode of the mobile device, a slide status of the mobile device, a position of the mobile device, and the like. For instance, Table 2 exemplarily shows a lookup table regarding the Personal Communications Service (PCS) 1900 band.

TABLE 2

| Band | Channel | Mode | Slide Status | Position | TMN Circuit Adjustment Value (Hexa Code) | | | |
|---|---|---|---|---|---|---|---|---|
| | | | | | 1st | 2nd | 3rd | 4th |
| PCS 1900 (40 adjust values) | 512~571 (60 chs.) | Call | S/U | Free | 00001c00 | 00001d00 | 00001b00 | 00001f00 |
| | | | | Hand | 1dff3900 | 1eff3900 | 1fff3900 | 1cff3900 |
| | | | | H + H | 1dff3703 | 1dff3702 | 1dff3704 | 1dff3705 |
| | | | S/D | Free | 00000100 | 00000200 | 00000300 | 00000000 |
| | | | | Hand | 1dff3900 | 1eff3900 | 1fff3900 | 1cff3900 |
| | | | | H + H | 1df83602 | 1df83603 | 1df83604 | 1df83601 |
| | | Idle | S/U | Free | 00001c00 | 00001d00 | 00001b00 | 00001f00 |
| | | | S/D | Free | 00000100 | 00000200 | 00000300 | 00000000 |
| | 572~631 (60 chs.) | Call | S/U | Free | 18103a00 | 18103900 | 18103b00 | 18103c00 |
| | | | | Hand | 1dfd3900 | 1efd3900 | 1ffd3900 | 1cfd3900 |
| | | | | H + H | 1dfd3302 | 1dfd3301 | 1dfd3303 | 1dfd3300 |
| | | | S/D | Free | 19403b00 | 19403c00 | 19403d00 | 19403a00 |
| | | | | Hand | 1deb1d00 | 1eeb1d00 | 1feb1d00 | 1ceb1d00 |
| | | | | H + H | 1deb2a00 | 1deb2a01 | 1deb2a02 | 1deb2a03 |
| | | Idle | S/U | Free | 18103a00 | 18103900 | 18103b00 | 18103c00 |
| | | | S/D | Free | 19403b00 | 19403c00 | 19403d00 | 19403a00 |
| | 632~691 (60 chs.) | Call | S/U | Free | 06103e00 | 06103d00 | 06103f00 | 06103c00 |
| | | | | Hand | 1dfd3900 | 1efd3900 | 1ffd3900 | 1cfd3900 |
| | | | | H + H | 1dfd3601 | 1dfd3600 | 1dfd3602 | 1dfd3603 |
| | | | S/D | Free | 07133d00 | 07133e00 | 07133f00 | 07133c00 |
| | | | | Hand | 1deb3900 | 1eeb3900 | 1feb3900 | 1ceb3900 |
| | | | | H + H | 1deb3701 | 1deb3700 | 1deb3702 | 1deb3703 |
| | | Idle | S/U | Free | 06103e00 | 06103d00 | 06103f00 | 06103c00 |
| | | | S/D | Free | 07133d00 | 07133e00 | 07133f00 | 07133c00 |
| | 692~751 (60 chs.) | Call | S/U | Free | 05503b00 | 05503d00 | 05503c00 | 05503a00 |
| | | | | Hand | 1dff3900 | 1eff3900 | 1fff3900 | 1cff3900 |
| | | | | H + H | 1dff3601 | 1dff3600 | 1dff3602 | 1dff3603 |
| | | | S/D | Free | 06211e00 | 06211d00 | 06211c00 | 06211f00 |
| | | | | Hand | 1dfa3900 | 1efa3900 | 1ffa3900 | 1cfa3900 |
| | | | | H + H | 1dfa3300 | 1dfa3301 | 1dfa3302 | 1dfa3303 |
| | | Idle | S/U | Free | 05503b00 | 05503d00 | 05503c00 | 05503a00 |
| | | | S/D | Free | 06211e00 | 06211d00 | 06211c00 | 06211f00 |
| | 752~810 (59 chs.) | Call | S/U | Free | 03013d00 | 03013e00 | 03013c00 | 03013f00 |
| | | | | Hand | 1dfc1f00 | 1efc1f00 | 1ffc1f00 | 1cfc1f00 |
| | | | | H + H | 1dfc2000 | 1dfc2001 | 1dfc2002 | 1dfc2003 |
| | | | S/D | Free | 03113b00 | 03113a00 | 03113c00 | 03113d00 |
| | | | | Hand | 1cfc1b00 | 1efc1b00 | 1ffc1b00 | 1cfc1b00 |
| | | | | H + H | 1dfc2100 | 1dfc2100 | 1dfc2102 | 1dfc2103 |
| | | Idle | S/U | Free | 03013d00 | 03013e00 | 03013c00 | 03013f00 |
| | | | S/D | Free | 03113b00 | 03113a00 | 03113c00 | 03113d00 |

In Table 2, mode parameters 'Call' and 'Idle' denote a call mode and an idle mode, respectively. Slide status parameters 'S/U' and 'S/D' denote a slide up status and a slide down status, respectively. In a case of position parameters, 'Free' denotes that the mobile device is located at any place free from a user's body effect, 'Hand' denotes that the mobile device is located at a user's hand, and 'H+H' (acronym for Head & Hand) denotes that the mobile device is located held in a user's hand near the user's head.

A position of the mobile device may be determined depending on criteria such as a slide status of the mobile device, a mode of the mobile device, whether a receiver is being used, whether a loudspeaker is being used, whether an ear jack is connected, whether a BLUETOOTH audio device is connected, etc., as exemplarily shown in Table 3.

TABLE 3

| Slide Status | Case | Mode | Receiver Used or Not | Loudspeaker Used or Not | Ear Jack Connected or Not | BLUETOOTH Audio Connected or not | Position |
|---|---|---|---|---|---|---|---|
| S/U | 1 | X | X | X | X | X | S/U Free |
| | 2 | X | X | X | X | ○ | |
| | 3 | X | X | X | ○ | X | |
| | 4 | X | X | X | ○ | ○ | |
| | 5 | X | X | ○ | X | X | X |
| | 6 | X | X | ○ | X | ○ | |
| | 7 | X | X | ○ | ○ | X | |
| | 8 | X | X | ○ | ○ | ○ | |
| | 9 | ○ | ○ | X | X | X | S/U H + H |
| | 10 | ○ | X | X | X | ○ | S/U Hand |
| | 11 | ○ | X | X | ○ | X | S/U Hand |
| | 12 | ○ | X | X | ○ | ○ | X |

TABLE 3-continued

| Slide Status | Case | Mode | Receiver Used or Not | Loudspeaker Used or Not | Ear Jack Connected or Not | BLUETOOTH Audio Connected or not | Position |
|---|---|---|---|---|---|---|---|
|  | 13 | O | X | O | X | X | S/U Hand |
|  | 14 | O | X | O | X | O | X |
|  | 15 | O | X | O | O | X |  |
|  | 16 | O | X | O | O | O |  |
| S/D | 1 | X | X | X | X | X | S/D Free |
|  | 2 | X | X | X | X | O |  |
|  | 3 | X | X | X | O | X |  |
|  | 4 | X | X | X | O | O |  |
|  | 5 | X | X | O | X | X | X |
|  | 6 | X | X | O | X | O |  |
|  | 7 | X | X | O | O | X |  |
|  | 8 | X | X | O | O | O |  |
|  | 9 | O | O | X | X | X | S/D H + H |
|  | 10 | O | X | X | X | O | S/D Hand |
|  | 11 | O | X | X | O | X | S/D Hand |
|  | 12 | O | X | X | O | O | X |
|  | 13 | O | X | O | X | X | S/D Hand |
|  | 14 | O | X | O | X | O | X |
|  | 15 | O | X | O | O | X |  |
|  | 16 | O | X | O | O | O |  |

In Table 3, mode parameters, 'O' and 'X', denote the call mode and the idle mode, respectively. For non-mode parameters, 'O' denotes a parameter that is selected or in effect, and 'X' denotes a parameter that is not selected or in effect. For example, case 9 of 'S/U' (slide up) status denotes that the mobile device is in the call mode, the receiver is being used, the loudspeaker is not being used, and the ear jack and BLUETOOTH audio device are not connected. The position of the mobile device in this case is defined as 'S/U H+H', which means that the mobile device is held in a user's hand and located near the user's head while in the slide up status. Also, case 13 of the 'S/D' (slide down) status denotes that the mobile device is in the call mode, the receiver is not being used, the loudspeaker is being used, and the ear jack and BLUETOOTH audio device are not connected. The position of the mobile device in this case is defined as 'S/D Hand', which denotes that the mobile device is located at a user's hand while in the slide down status. Additionally, if the mobile device includes a proximity sensor, an acceleration sensor, etc., the position of the mobile device may be defined in more detail.

Figure 1:
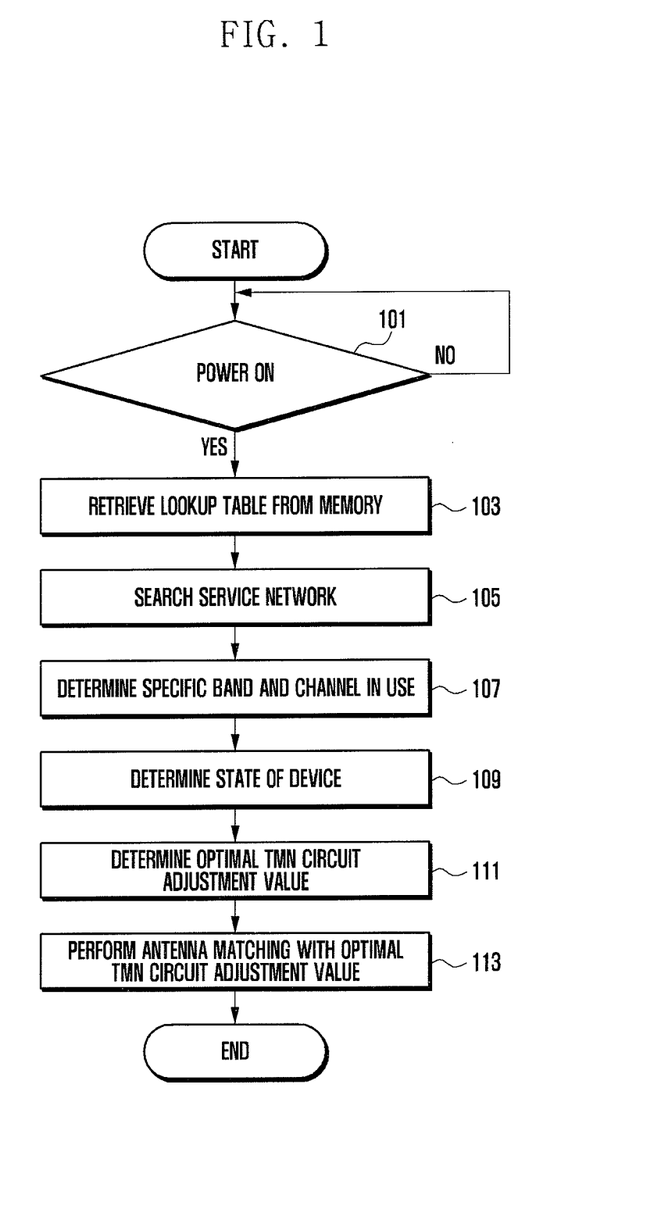
FIG. 1 is a flow diagram illustrating an antenna matching method in a mobile device in accordance with an exemplary embodiment of the present invention.

FIG. 1 is a flow diagram illustrating an antenna matching method in a mobile device in accordance with an exemplary embodiment of the present invention.

Referring to FIG. 1, the mobile device determines whether the power is turned on at step 101.

In a case of power on, the mobile device retrieves a lookup table from a memory unit at step 103. The lookup table may be constructed as exemplarily shown in Table 2. The mobile device classifies all channels in each band of each service network into groups, constructs the lookup table for each group, and then stores in advance the lookup tables in the memory unit.

Next, the mobile device searches the service network at step 105 and determines a specific band and channel that are used by the mobile device in the service network at step 107.

Next, the mobile device determines its own state at step 109. Namely, the mobile device determines its mode, its slide status, its position, and the like. In this step, the mobile device may determine its own position on a basis of criteria such as a slide status, a mode, whether a receiver is being used, whether a loudspeaker is being used, whether an ear jack is connected, whether a BLUETOOTH audio device is connected, etc.

Next, based on the retrieved lookup table, the mobile device determines an optimal TMN circuit adjustment value for a specific band and channel in use and for its determined state at step 111.

Next, the mobile device performs antenna matching in accordance with the optimal TMN circuit adjustment value at step 113. Namely, the mobile device performs an antenna matching with an inductive-capacitive (LC) circuit component value in accordance with the optimal TMN circuit adjustment value.

Figure 3:
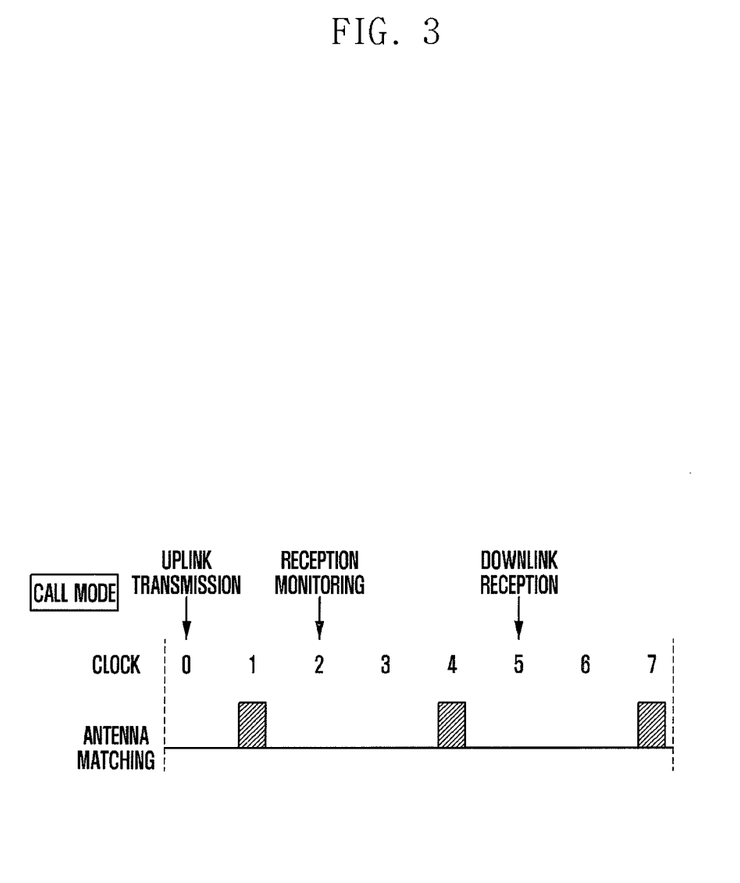
FIG. 3 is a view illustrating a timing of an antenna matching while in a call mode of a mobile device in accordance with an exemplary embodiment of the present invention.

More particularly, the mobile device may differently establish a timing of the antenna matching, depending on the mode of the mobile device. In a case of a call mode, the mobile device may determine the antenna matching timing except when conflicting with the uplink transmission time, the downlink reception time, and the reception monitoring execution time. For instance, as shown in FIG. 3, assume that uplink transmission, reception monitoring, and downlink reception are performed respectively at clock cycles 0, 2, and 5 among eight clock cycles per frame in the call mode. In this case, the mobile device may perform the antenna matching at clock cycles 1, 4 and 7. In a case of an idle mode, the mobile device may perform the antenna matching when an event, such as a band change, a channel change, a change in the state of the mobile device, etc., occurs. Therefore, the mobile device may determine the timing of the antenna matching, depending on the mode of the mobile device, and may then perform the antenna matching at the determined timing. Thereafter, the mobile device terminates a predefined algorithm of an exemplary embodiment of the present invention.

Figure 2:
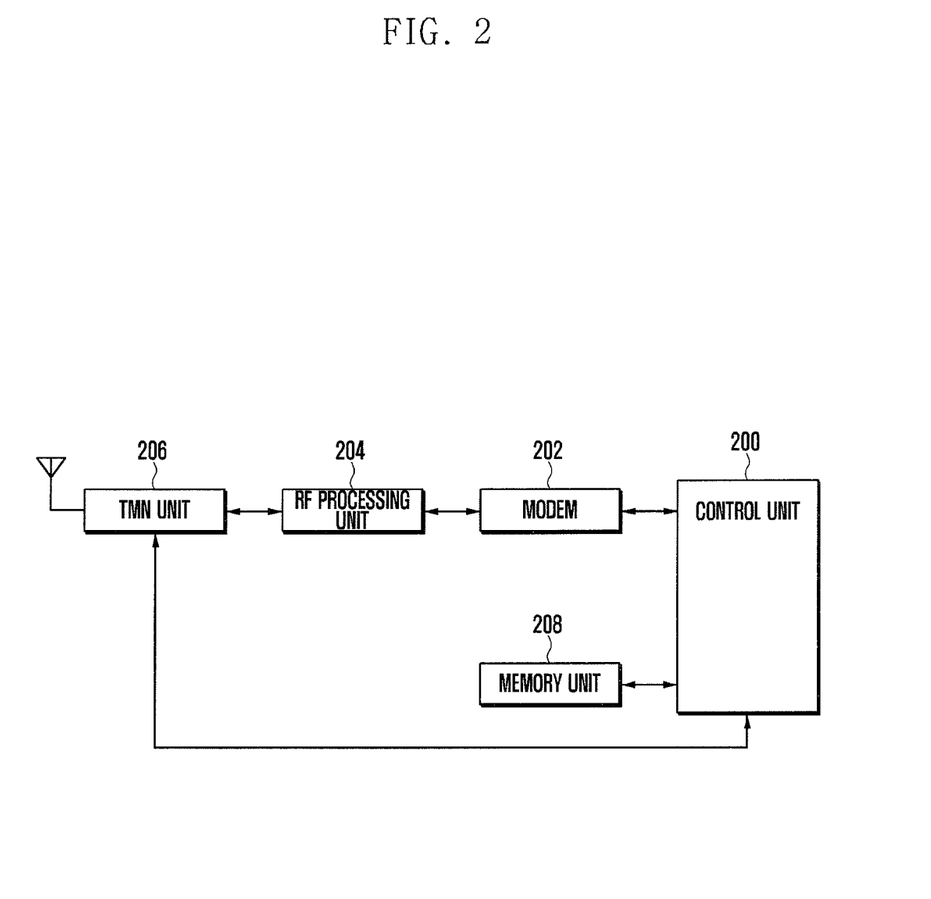
FIG. 2 is a block diagram illustrating a configuration of a mobile device in accordance with an exemplary embodiment of the present invention.

FIG. 2 is a block diagram illustrating a configuration of a mobile device in accordance with an exemplary embodiment of the present invention.

Referring to FIG. 2, the mobile device includes a control unit 200, a modem 202, a Radio Frequency (RF) processing unit 204, a TMN unit 206, and a memory unit 208.

The control unit 200 performs controlling and processing for the operation of the mobile device. Also, the control unit 200 provides a transmission signal to the modem 202 and processes a signal received from the modem 202. In addition to such normal functions, the control unit 200 processes a particular function to perform antenna matching in accordance with a user's body effect and a state of the mobile device. A detailed operation thereof is described below.

At the outset, the control unit 200 determines a state of the mobile device. Namely, the control unit 200 determines criteria such as a mode of the mobile device, a slide status of the mobile device, a position of the mobile device, and the like. At this time, the mobile device may determine the position of the mobile device on a basis of criteria such as the slide status of the mobile device, the mode of the mobile device, whether a receiver is being used, whether a loudspeaker is being used, whether an ear jack is connected, whether a BLUETOOTH audio device is connected, etc. For instance, if the mobile device is in the idle mode, the control unit 200 determines that the state of the mobile device is the 'Free' state. When the mobile device is switched from the idle mode to the call mode, the control unit 200 determines the slide status, reads the memory unit, and then determines whether a receiver is being used. If the slide is the up status and the receiver is being used, the control unit 200 determines that the state of the mobile device is the 'S/U H+H' state, as shown in Table 3 above. If a signal for switchover from a receiver to a speaker is input, the control unit 200 changes the state of the mobile device from the 'S/U H+H' state to the 'S/U Hand' state.

Additionally, the control unit 200 retrieves a lookup table from the memory unit 208, determines an optimal TMN circuit adjustment value, in accordance with a specific band and channel in use and the state of the mobile device, on a basis of the retrieved lookup table, and provides the optimal TMN circuit adjustment value to the TMN unit 206. In this exemplary embodiment, this provision process is carried out through a physical layer rather than through an application layer, but the present invention is not limited thereto. Therefore, if it is determined that antenna matching is required in response to a band change, a channel change, or a change in the state of the mobile device, the TMN unit 206 may immediately perform the antenna matching at that timing.

The modem 202 performs baseband modulation and demodulation for transmission and reception signals.

The RF processing unit 204 performs processing of RF band signals for transmission and reception. For instance, the RF processing unit 204 performs an amplification of an RF band signal, a conversion between the RF band signal and a baseband signal, and the like.

The TMN unit 206 includes a variable LC circuit designed for antenna matching on a path between an antenna and the RF processing unit 204, and performs the antenna matching in accordance with the optimal TMN circuit adjustment value provided by the control unit 200. Namely, the TMN unit 206 performs an antenna matching with an LC circuit component value in accordance with the optimal TMN circuit adjustment value.

More particularly, the TMN unit 206 may differently establish a timing of the antenna matching, depending on the mode of the mobile device.

In a case of the call mode, the TMN unit 206 may determine the antenna matching timing except when conflicting with the uplink transmission time, the downlink reception time, and the reception monitoring execution time. In a case of the idle mode, the TMN unit 206 may perform an antenna matching at a time of an event occurrence such as a band change, a channel change, a change in a state of the mobile device, etc.

The memory unit 208 stores a microcode of programs for processing and controlling of the control unit 200 and various reference data, and temporarily stores data created during execution of programs. More particularly, the memory unit 208 stores a specific program for performing antenna matching in accordance with a user's body effect and a state of the mobile device. Additionally, the memory unit 208 stores a lookup table. The lookup table may be constructed as exemplarily shown in Table 2. The control unit 200 classifies all channels in each band of each service network into groups, constructs a lookup table for each group, and then stores the lookup tables in the memory unit 208. A number of channel groups may be determined in accordance with a bandwidth of each band.

Table 4 shows results of a measurement of RF performance of Total Radiated Power/Total Isotropic Sensitivity (TRP/TIS) of a mobile device having a configuration as exemplarily shown in FIG. 2.

TABLE 4

| 3-Channel Average based on GH-C5130 | | GSM850 | | DCS1800 | | PCS1900 | |
|---|---|---|---|---|---|---|---|
| | | TRP | TIS | TRP | TIS | TRP | TIS |
| Free | Ref | 25.5 | 104.1 | 26.4 | 104.6 | 23.8 | 104.2 |
| | TMN | 27.5 | 103.6 | 27.4 | 105.4 | 26.8 | 104.3 |
| | Δ | 2.0↑ | 0.5↓ | 1.0↑ | 0.8↑ | 3.0↑ | 0.1↑ |
| Hand | Ref | 21.4 | 96.8 | 23.1 | 98.7 | 20.4 | 101.6 |
| | TMN | 22.1 | 98.5 | 23.9 | 101.8 | 23.9 | 101.5 |
| | Δ | 0.7↑ | 1.7↑ | 0.8↑ | 3.1↑ | 3.5↑ | 0.1↓ |
| H + H (Head + Hand) | Ref | 20.6 | 97.4 | 20.7 | 97.4 | 18.3 | 99 |
| | TMN | 21.6 | 98.1 | 22.2 | 99.9 | 21.5 | 99.3 |
| | Δ | 1.0↑ | 0.7↑ | 1.5↑ | 2.5↑ | 3.2↑ | 0.3↑ |

In Table 4, 'GSM850', 'DCS1800' and 'PCS1900' represent different service network bands. Also, 'Ref' denotes a case to which a TMN technique is not applied, and 'TMN' denotes another case to which the TMN technique is applied. 'TRP' and 'TIS' are indexes that indicate a transmission performance and a reception performance of the wireless communication equipment in a free space. Among them, 'TRP' denotes a maximum transmission power when a Bit Error Rate (BER) is 2.44%. Higher TRP and TIS measurements denote a good antenna matching, minimization of reflected voltage, and improvement in RF performance of the mobile device have been achieved.

Table 5 shows results of a measurement for a Transmission (Tx)/Reception (Rx) rate and a mute rate of the mobile device having the configuration as exemplarily shown in FIG. 2.

TABLE 5

| | | GSM850 | DCS1800 | PCS1900 |
|---|---|---|---|---|
| Tx/Rx Rate | Tx | 30% superior | Equal | 20% superior |
| | Rx | 20% superior | Equal | 10% superior |
| Mute Rate | Tx | 15% superior | 9% superior | 18% superior |
| | Rx | 32% superior | Equal | 10% superior |

Table 5 indicates results of the measurement for a Tx/Rx rate and a mute rate in a case to which the TMN technique of an exemplary embodiment of the present invention is applied, in comparison with a case where the TMN technique of an exemplary embodiment of the present invention is not applied. As shown in Table 5, the case using the TMN technique of an exemplary embodiment of the present invention generally achieves relatively advantageous measured results.

Figure 4:
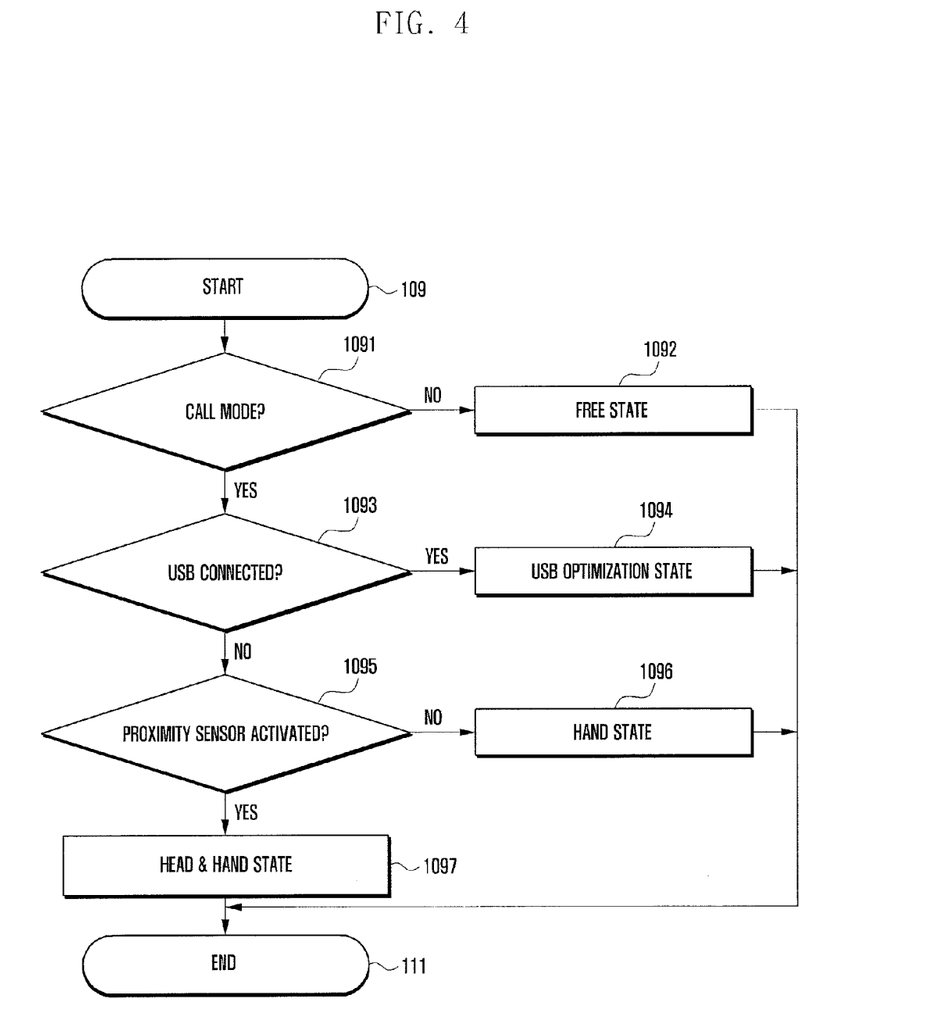
FIG. 4 is a flow diagram illustrating a process of determining a state of a mobile device in an antenna matching method in accordance with an exemplary embodiment of the present invention.

FIG. 4 is a flow diagram illustrating a process of determining a state of a mobile device in an antenna matching method in accordance with an exemplary embodiment of the present invention.

After power is turned on at step 101 of FIG. 2, the mobile device retrieves a lookup table from a memory unit at step 103. Then the mobile device determines its band in use through a Real Time Operating System (RTOS) and selects a specific channel at step 107. Next, the mobile device determines its state at step 109. For instance, the mobile device determines through the RTOS whether its mode is a call mode or an idle mode. Also, through a non-RTOS, the mobile device may determine whether a proximity sensor is activated and whether a Universal Serial Bus (USB) device is connected.

Depending on the mode of the mobile device, whether the proximity sensor is activated, and whether the USB device is connected, the state of the mobile device may be determined as one of a Free state, a Hand state, a Head & Hand state, and a USB Optimization state, as shown in Table 6.

TABLE 6

| Mode | Proximity Sensor | USB | State |
|---|---|---|---|
| Idle | Don't care | X | Free |
| Call | X | X | Hand |
| Call | O | X | Head + Hand |
| Call | Don't care | O | USB Optimization |
| Don't care | Don't care | Don't care | Test Mode (Key String Test Mode)<br>1. Free<br>2. Hand<br>3. Head<br>4. Head + Hand<br>5. USB Optimization |

In Table 6, parameters 'O' and 'X' of the proximity sensor respectively denote the proximity or not of a foreign object to the proximity sensor. Also, parameters 'O' and 'X' of the USB respectively denote the connection or disconnection of an external device to a USB connector of the mobile device, and 'Don't care' denote that the parameter is not considered.

Referring to FIG. 4, the mobile device determines the mode at step 1091. In a case of the idle mode, the mobile device determines that its state is the 'Free' state at step 1092, and then proceeds to the aforesaid step 111. When performing the step 1092, the mobile device does not consider whether the proximity sensor is activated. Also, in a case of the idle mode, the mobile device regards no external device as being connected to the USB connector.

In a case of the call mode, the mobile device determines whether a USB device is connected at step 1093. If any external device is connected to the USB connector, the mobile device determines that its state is the 'USB Optimization' state at step 1094, and then proceeds to the step 111. When performing the step 1094, the mobile device does not consider whether the proximity sensor is activated.

If no external device is connected to the USB connector, the mobile device determines whether the proximity sensor is activated at step 1095. If the proximity sensor is not activated, the mobile device determines that its state is the 'Hand' state at step 1096, and then proceeds to the step 111.

If the proximity sensor is activated, the mobile device determines that its state is the 'Head+Hand' state at step 1097, and then proceeds to the step 111. The activation of the proximity sensor means that the proximity sensor outputs a detecting signal to the control unit of the mobile device when a foreign object approaches the proximity sensor.

If a specific input signal is input, the mobile device outputs a test mode (also referred to as a key string test mode) screen for testing RF performance, etc. In a case of the test mode, the mobile device does not consider the call mode, whether the proximity sensor is activated, and whether the USB device is connected. In this test mode, a user may determine a state of the mobile device at his or her own discretion. Namely, after the mobile device enters into the test mode, the user may determine that the state of the mobile device is one of the 'Free', 'Hand', 'Head', 'Head+Hand', and 'USB Optimization' states. For instance, the user may select the 'Free' state as the state of the mobile device by pressing a numeral key '1'.

Figure 5:
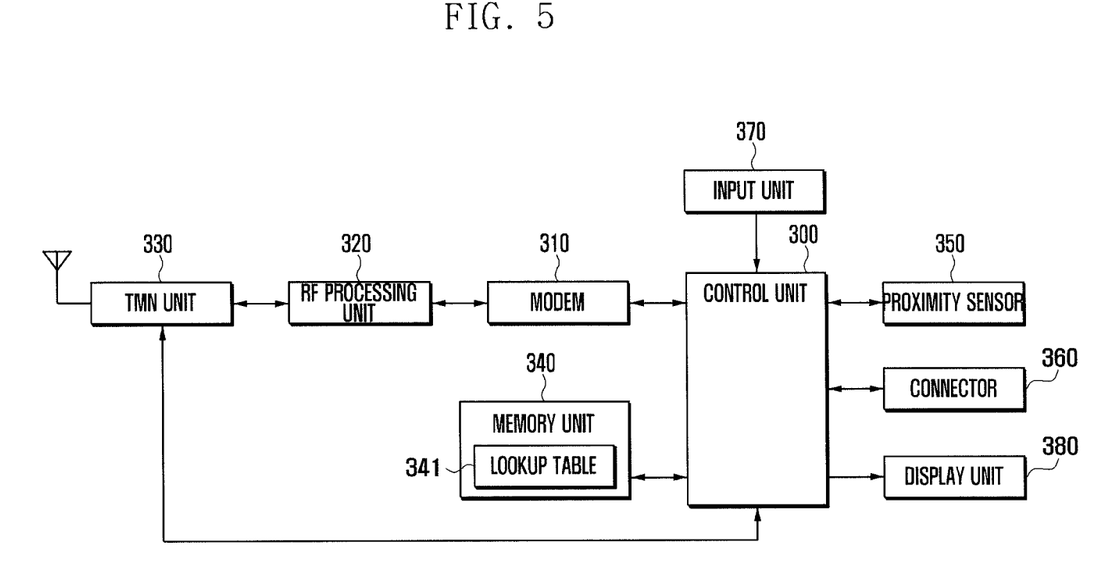
FIG. 5 is a block diagram illustrating a configuration of a mobile device in accordance with an exemplary embodiment of the present invention.

FIG. 5 is a block diagram illustrating a configuration of a mobile device in accordance with an exemplary embodiment of the present invention.

Referring to FIG. 5, the mobile device may include a control unit 300, a modem 310, an RF processing unit 320, a TMN unit 330, a memory unit 340, a proximity sensor 350, a connector 360, an input unit 370, and a display unit 380.

The control unit 300 receives a signal indicating whether a foreign object is in the proximity of the proximity sensor 350. Also, the control unit 300 receives a signal indicating whether an external device is connected from the connector 360.

The control unit 300 determines a state of the mobile device, depending on criteria such as the call mode, whether the proximity sensor is activated, whether a USB device is connected, and the like. For instance, in a case of the idle mode, the control unit 300 determines that the state of the mobile device is the 'Free' state.

When the mobile device is switched from the idle mode to the call mode, the control unit 300 determines whether any external device is connected and whether the proximity sensor is activated. If an external device is connected to the connector 360, the control unit 300 determines that the state of the mobile device is a 'USB Optimization' state. If no external device is connected and if a detecting signal is received from the proximity sensor 350, the control unit 300 determines that the state of the mobile device is a 'Head & Hand' state. If a detecting signal ceases being received from the proximity sensor 350, the control unit 300 switches the state of the mobile device from the 'Head & Hand' state to a 'Hand' state.

If a specific input signal (e.g., #7800*#) is received from the input unit 370, the control unit 300 switches the state of the mobile device to a test mode. In the test mode, the control unit 300 controls the display unit 380 to output a test mode screen. If a signal for state determination is received from the input unit 370 while in the test mode, the control unit 300 determines that the state of the mobile device is a specific state corresponding to the received signal. In order to determine the state of the mobile device in the test mode, the control unit 300 does not consider the call mode, whether the proximity sensor is activated, and whether the USB device is connected. Additionally, based on a lookup table 341 stored in the memory unit 340, the control unit 300 determines an optimal TMN circuit adjustment value for a specific band and channel in use and for its determined state, and then provides it to the TMN unit 330.

Each of the modem 310, the RF processing unit 320, the TMN unit 330 and the memory unit 340 performs the same function as earlier discussed with regard to FIG. 2, so a repetition of that discussion will be omitted in this exemplary embodiment.

The lookup table 341 contains optimal TMN circuit adjustment values according to the 'Free', 'Hand', 'Head+Hand', and 'USB Optimization' states.

The proximity sensor 350 of this exemplary embodiment may comprise a light-emitting unit, a light-receiving unit, and an isolation layer, and may be provided on a circuit board in the mobile device, although the present invention is not limited thereto. The proximity sensor 350 detects an approach of a foreign object and outputs a detection signal to the control unit 300. In accordance with a received detection signal, the control unit 300 may allow or not allow a user's input from the input unit 370, such as a touch screen. Additionally, the control unit 300 may perform antenna matching in accordance with a detection signal received from the proximity sensor 350.

The light-emitting unit of the proximity sensor 350 sends out light so as to measure a proximity distance of a certain foreign object from the mobile device. The light-receiving unit of the proximity sensor 350 receives light reflected by the foreign object. The isolation layer of the proximity sensor 350 is installed between the light-emitting unit and the light-receiving unit so as to prevent the light of the light-emitting unit from directly entering into the light-receiving unit. Therefore, the isolation layer prevents erroneous operations of the proximity sensor 350. Preferably, the proximity sensor 350 of this exemplary embodiment may employ an InfraRed (IR) sensor for detecting a presence of the foreign object within a detection area through IR rays. In this case, the light-emitting unit may be formed of a Light Emitting Diode (LED) capable of emitting IR rays.

The above-discussed structure of the proximity sensor 350 is exemplary only and not to be considered as a limitation of this invention. Alternatively, the proximity sensor 350 may comprise an integrated structure of the light-emitting unit and the light-receiving unit. Also, the proximity sensor 350 may further comprise a lens disposed thereon. The lens passes light emitted from the light-emitting unit and light entering into the light-receiving unit, and also protects the proximity sensor 350 from exposure to the outside.

When there is a wired or wireless connection of any external device to the mobile device, the connector 360 outputs a notification signal to the control unit 300. Thus, the control unit 300 may perform antenna matching in accordance with whether external devices are connected. Also, the connector 360 outputs data, received from the external device, to the control unit 300 and transmits data, received from the control unit 300, to the external device. The connector 360 may include a USB terminal, an ear jack, a BLUETOOTH module, a Terminal Adapter (TA) terminal, a dock terminal for recharge, and the like.

Table 7 shows results of a measurement of RF performance (TRP/TIS) of a mobile device comprising a configuration as exemplarily shown in FIG. 5.

European mobile communication company. 'Default ANT' denotes a case to which the TMN technique of an exemplary embodiment of the present invention is not applied, and 'With Tunable' denotes another case to which the TMN technique of an exemplary embodiment of the present invention is applied. 'Free Space' denotes the aforesaid 'Free' state, and 'Head Phantom' denotes a state in which the mobile device is attached to a head of a human body model. Additionally, slash-separated left/right values of measurement results correspond to TRP and TIS, respectively.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for an antenna matching in a mobile device, the method comprising:
    retrieving a lookup table from the mobile device;
    determining a state of the mobile device;
    determining an optimal Tunable Matching Network (TMN) circuit adjustment value in accordance with the determined state of the mobile device based on the retrieved lookup table; and
    performing antenna matching in accordance with the optimal TMN circuit adjustment value,
    wherein the lookup table includes a plurality of groups, each group classifying all channels of each band of each service network into a respective group.

2. The method of claim 1, wherein the determining of the state of the mobile device includes determining one of a Hand state, a Head & Hand state, and a Free state on a basis of a call mode and at least one of whether an external device is connected, whether a receiver is being used, whether a speaker is being used, and whether a detecting signal is received from a proximity sensor,
    wherein the Hand state comprises the mobile device being located at a user's hand while in the call mode,
    wherein the Head & Hand state comprises the mobile device being held in the user's hand and located near the user's head while in the call mode, and
    wherein the Free state comprises the mobile device being in an idle mode.

TABLE 7

|  | Band | GSM850 | GSM900 | DCS1800 | PCS1900 | WCDMA2100 | WCDMA1900 | WCDMA900 |
|---|---|---|---|---|---|---|---|---|
| Free Space | Voda Spec. | 26.5/103 | 28/104.5 | 26/103 | 24.5/101.5 | 20/106 | — | 19/104.5 |
|  | Default ANT | 25.2/104.1 | 26.2/100.3 | 25.3/103.2 | 24.4/100.8 | 17.7/103.7 | 19.2/101.7 | 16.7/103 |
|  | With Tunable | 26.8/104.6 | 28.3/105.4 | 26.6/105.1 | 25/101.9 | 19.6/107.5 | 20.2/102.8 | 19/107 |
|  | Δ | +1.6/+0.5 | +2.1/+5.1 | +1.3/+1.9 | +0.6/+1.1 | +1.9/+3.8 | +1.0/+1.1 | +2.3/+4.0 |
| Head Phantom | Voda Spec. | 22.5/98.5 | 24/100 | 24/102 | 22.5/100.5 | 18/104 | 16.5/100.5 | 15/100 |
|  | Default ANT | 18.2/97.4 | 21.5/96.2 | 22.3/101.9 | 22.9/100 | 16.9/102.8 | 17.6/101.1 | 13/97.7 |
|  | With Tunable | 22.5/99.3 | 24.2/101.2 | 24.7/103.8 | 24.3/101.2 | 18.2/105.6 | 19.3/101.3 | 15.2/102.3 |
|  | Δ | +4.3/+1.9 | +2.7/+5.0 | +2.4/+1.9 | +1.4/+1.2 | +1.3/+2.8 | +1.7/+0.2 | +2.2/+4.6 |

In Table 7, 'GSM850', 'GSM900', 'DCS1800', 'PCS1900', 'WCMA2100', 'WCMA1900' and 'WCMA900' represent different service network bands. Also, 'Voda Spec.' denotes a standard defined by Vodafone, a 3. The method of claim 2, wherein the state of the mobile device further includes a Universal Serial Bus (USB) Optimization state comprising the external device being connected to a USB connector while in the call mode.

4. The method of claim 3, wherein the determining of the state of the mobile device includes:
   if the mobile device is in the idle mode, determining that the state of the mobile device is the Free state;
   if the external device is connected to the USB connector while in the call mode, determining that the state of the mobile device is the USB Optimization state;
   if the external device is not connected to the USB connector while in the call mode and if a signal is not input from the proximity sensor, determining that the state of the mobile device is the Hand state; and
   if the external device is not connected to the USB connector while in the call mode and if a signal is input from the proximity sensor, determining that the state of the mobile device is the Head & Hand state.

5. The method of claim 4, wherein the determining of the state of the mobile device further includes:
   if a signal for state determination is input in a test mode, determining that the state of the mobile device is a specific state, in accordance with the signal, among the Hand state, the Head & Hand state, the Free state, and the USB Optimization state.

6. The method of claim 2, wherein the determining of the state of the mobile device includes:
   if the mobile device is in the idle mode, determining that the state of the mobile device is the Free state;
   if the mobile device is in the call mode and if the receiver is being used, determining that the state of the mobile device is the Head & Hand state; and
   if the mobile device is in the call mode and if the speaker is being used, determining that the state of the mobile device is the Hand state.

7. The method of claim 1, wherein the antenna matching is performed at a specific time except a time conflicting with an uplink transmission time, a downlink reception time, or a reception monitoring execution time in the call mode.

8. The method of claim 1, wherein the determined state comprises at least one of a band being used by the mobile device, a channel of the band, call mode, a slide status of the mobile device, a position of the mobile device, whether an external device is connected to the mobile device, whether a receiver is being used and whether a speaker is being used.

9. The method of claim 1, wherein the determining of the optimal Tunable Matching Network (TMN) circuit adjustment value comprises searching a service network, determining a band and channel that are used by the mobile device in the service network and determining the optimal Tunable Matching Network (TMN) circuit adjustment value in accordance with the determined band and channel.

10. An apparatus for antenna matching in a mobile device, the apparatus comprising:
   a memory unit storing a lookup table;
   a control unit for determining a state of the mobile device, and for determining an optimal Tunable Matching Network (TMN) circuit adjustment value in accordance with the determined state of the mobile device based on the lookup table; and
   a TMN unit for receiving the optimal TMN circuit adjustment value from the control unit and for performing the antenna matching in accordance with the received value,
   wherein the lookup table includes a plurality of groups, each group classifying all channels of each band of each service network into a respective group.

11. The apparatus of claim 10, wherein the determining of the state of the mobile device includes determining one of a Hand state, a Head & Hand state, and a Free state on a basis of a call mode and at least one of whether an external device is connected, whether a receiver is being used, whether a speaker is being used, and whether a detecting signal is received from a proximity sensor,
   wherein the Hand state comprises the mobile device being located at a user's hand while in the call mode,
   wherein the Head & Hand state comprises the mobile device being held in the user's hand and located near the user's head while in the call mode, and
   wherein the Free state comprises the mobile device being in an idle mode.

12. The apparatus of claim 11, wherein the state of the mobile device further includes a Universal Serial Bus (USB) Optimization state comprising the external device being connected to a USB connector while in the call mode.

13. The apparatus of claim 12, wherein the control unit is further configured to:
   if the mobile device is in the idle mode, determine that the state of the mobile device is the Free state;
   if the external device is connected to the USB connector while in the call mode, determine that the state of the mobile device is the USB Optimization state;
   if the external device is not connected to the USB connector while in the call mode and if a signal is not inputted from the proximity sensor, determine that the state of the mobile device is the Hand state; and
   if the external device is not connected to the USB connector while in the call mode and if a signal is inputted from the proximity sensor, determine that the state of the mobile device is the Head & Hand state.

14. The apparatus of claim 13, wherein the control unit is further configured to:
   if a signal for state determination is input while in a test mode, determine that the state of the mobile device is a specific state, in accordance with the signal, among the Hand state, the Head & Hand state, the Free state, and the USB Optimization state.

15. The apparatus of claim 11, wherein the control unit is further configured to:
   if the mobile device is in the idle mode, determine that the state of the mobile device is the Free state;
   if the mobile device is in the call mode and if the receiver is being used, determine that the state of the mobile device is the Head & Hand state; and
   if the mobile device is in the call mode and if the speaker is being used, determine that the state of the mobile device is the Hand state.

16. An apparatus for antenna matching in a mobile device, the apparatus comprising:
   a connector for connecting an external device;
   a proximity sensor for detecting an approach of a foreign object;
   a control unit for retrieving a lookup table and for determining a state of the mobile device on a basis of a signal received from the connector, a signal received from the proximity sensor, and a call mode, and for determining an optimal Tunable Matching Network (TMN) circuit adjustment value in accordance with the determined state of the mobile device based on the retrieved lookup table; and
   a TMN unit for receiving the optimal TMN circuit adjustment value from the control unit and for performing the antenna matching in accordance with the received value,
   wherein the lookup table includes a plurality of groups, each group classifying all channels of each band of each service network into a respective group.

* * * * *